United States Patent [19]

Hunter et al.

[11] Patent Number: 5,014,573

[45] Date of Patent: May 14, 1991

[54] DOUBLE TRANSITION UPSHIFT CONTROL IN AN AUTOMATIC TRANSMISSION

[75] Inventors: Joseph H. Hunter, Carmel; Jeffrey K. Runde, Indianapolis, both of Ind.

[73] Assignee: General Motors Corporation, Detroit, Mich.

[21] Appl. No.: 448,452

[22] Filed: Dec. 11, 1989

[51] Int. Cl.$^5$ .................. F16H 59/46; F16H 61/06
[52] U.S. Cl. ........................... 74/866; 74/732.1
[58] Field of Search ............. 74/862, 732.1, 733.1, 74/336 R, 866; 192/3.57, 48.7, 103 F

[56] References Cited

U.S. PATENT DOCUMENTS

| | | | |
|---|---|---|---|
| 4,517,859 | 5/1985 | Nagaoka et al. | 74/336 R |
| 4,653,350 | 3/1987 | Downs et al. | 74/866 X |
| 4,674,364 | 6/1987 | Shindo et al. | 74/867 |
| 4,690,017 | 9/1987 | Taniguchi et al. | 74/866 |
| 4,700,591 | 10/1987 | Yasue et al. | 74/868 |
| 4,718,310 | 1/1988 | Shindo et al. | 74/867 |
| 4,722,247 | 2/1988 | Shindo et al. | 74/866 |
| 4,732,246 | 3/1988 | Tateno et al. | 74/866 X |
| 4,757,886 | 7/1988 | Brown et al. | 192/103 F |
| 4,790,418 | 12/1988 | Brown et al. | 74/336 R |
| 4,796,490 | 1/1989 | Butts et al. | 74/866 |

Primary Examiner—Allan D. Herrmann
Assistant Examiner—Khoi Q. Ta
Attorney, Agent, or Firm—Mark A. Navarre

[57] ABSTRACT

In an automatic transmission, a double transition upshift to a target range requires the release of two off-going clutches and the engagement of two on-coming clutches. The shift is made in two stages. The first stage involves a first off-going clutch and a first on-coming clutch, and begins a shift to a third range having a speed ratio lower than the target range so that input speed is decreased and power is supplied throughout the shift. The speed decrease is managed by a closed-loop control of the first on-coming clutch until the clutch reaches a synchronous speed for the target range. The closed-loop control parameter is on-coming clutch slip speed which is controlled to a calculated slip speed profile. The profile has a first steep slope and a final less steep slope so that the actual slip can smoothly go to zero in a given time period. When near synchronous speed is reached, the second off-going clutch begins to release and at the end of the closed-loop control the second on-coming clutch is applied to complete the shift to the target range.

10 Claims, 16 Drawing Sheets

DOUBLE TRANSITION LOW → 1st UPSHIFT

| RANGE | C1 | C2 | C3 | C4 | C5 | C6 |
|-------|----|----|----|----|----|----|
| LO    |    |    | X  |    |    | X  |
| 1     | X  |    |    |    | X  |    |
| 2     | X  |    |    | X  |    |    |
| 3     | X  |    | X  |    |    |    |
| 4     | X  | X  |    |    |    |    |
| 5     |    | X  | X  |    |    |    |
| 6     |    | X  |    | X  |    |    |
| R     |    |    | X  |    | X  |    |

DOUBLE TRANSITION UPSHIFT CONTROL IN AN AUTOMATIC TRANSMISSION

FIELD OF THE INVENTION

This invention relates to a method of controlling a shift in an automatic transmission, and more particularly, for a double transition upshift.

BACKGROUND OF THE INVENTION

Generally, a motor vehicle automatic transmission includes a number of gear elements coupling its input and output shafts, and a related number of torque establishing devices such as clutches and brakes which are selectively engageable to activate certain gear elements for establishing a desired speed ratio between the input and output shafts. The brake can be of the band type or disk type; engineering personnel in the automotive art refer to disc type brakes in transmissions as "clutches" or "reaction clutches". As used herein, the terms "clutches" and "torque transmitting devices" will be used to refer to brakes as well as clutches.

The input shaft is connected to the vehicle engine through a fluid coupling, such as a torque converter, and the output shaft is connected directly to the vehicle wheels. Shifting from one forward speed ratio to another is performed in response to engine throttle and vehicle speed, and generally involves releasing or disengaging the clutch (off-going) associated with the current speed ratio and applying or engaging the clutch (on-coming) associated with the desired speed ratio. In this disclosure, a double transition is featured, wherein two clutches associated with the current speed ratio are released and two other clutches associated with the desired speed ratio are engaged.

The speed ratio is defined as the transmission input speed or turbine speed divided by the output speed. Thus, a low gear range has a high speed ratio and a higher gear range has a lower speed ratio. To perform an upshift, a shift is made from a high speed ratio to a low speed ratio. In the type of transmission involved in this invention, the upshift from low range to first range is accomplished by disengaging two clutches associated with the higher speed ratio and engaging two clutches associated with the lower, or target, speed ratio to thereby reconfigure the gear set to operate at the lower speed ratio. Shifts performed in the above manner require precise timing in order to achieve high quality shifting. In the case of double transition shifts, particular care must be taken to avoid clutch tie-up or a momentary shift to neutral during the range shift, and instead to provide power throughout the shift.

SUMMARY OF THE INVENTION

It is therefore an object of the invention to provide a method of controlling a double transition shift which ensures uninterrupted power flow throughout the shift.

It is another object of the invention to provide a method of controlling an upshift in an automatic transmission by engaging first one clutch and then another clutch in a controlled manner, while disengaging two other clutches and using transmission speed feedback to manage the control. In particular, a motor vehicle automatic transmission with an electronic control system achieves high quality double transition shifts by first beginning a shift to a range higher than the target range and then completing the shift to the target range when the speeds are nearly synchronous for the target range.

BRIEF DESCRIPTION OF THE DRAWINGS

The above and other advantages of the invention will become more apparent from the following description taken in conjunction with the accompanying drawings wherein like references refer to like parts and wherein:

FIG. 1b is a diagram illustrating the clutch engagements required to establish the various speed ratios of the transmission depicted in FIG 1a.

FIGS. 2 and 3a–b are flow diagrams representative of computer program instructions executed by the computer-based controller of FIG. 1a in carrying out the shift control of the transmission.

DETAILED DESCRIPTION OF THE INVENTION

Figure 1A:
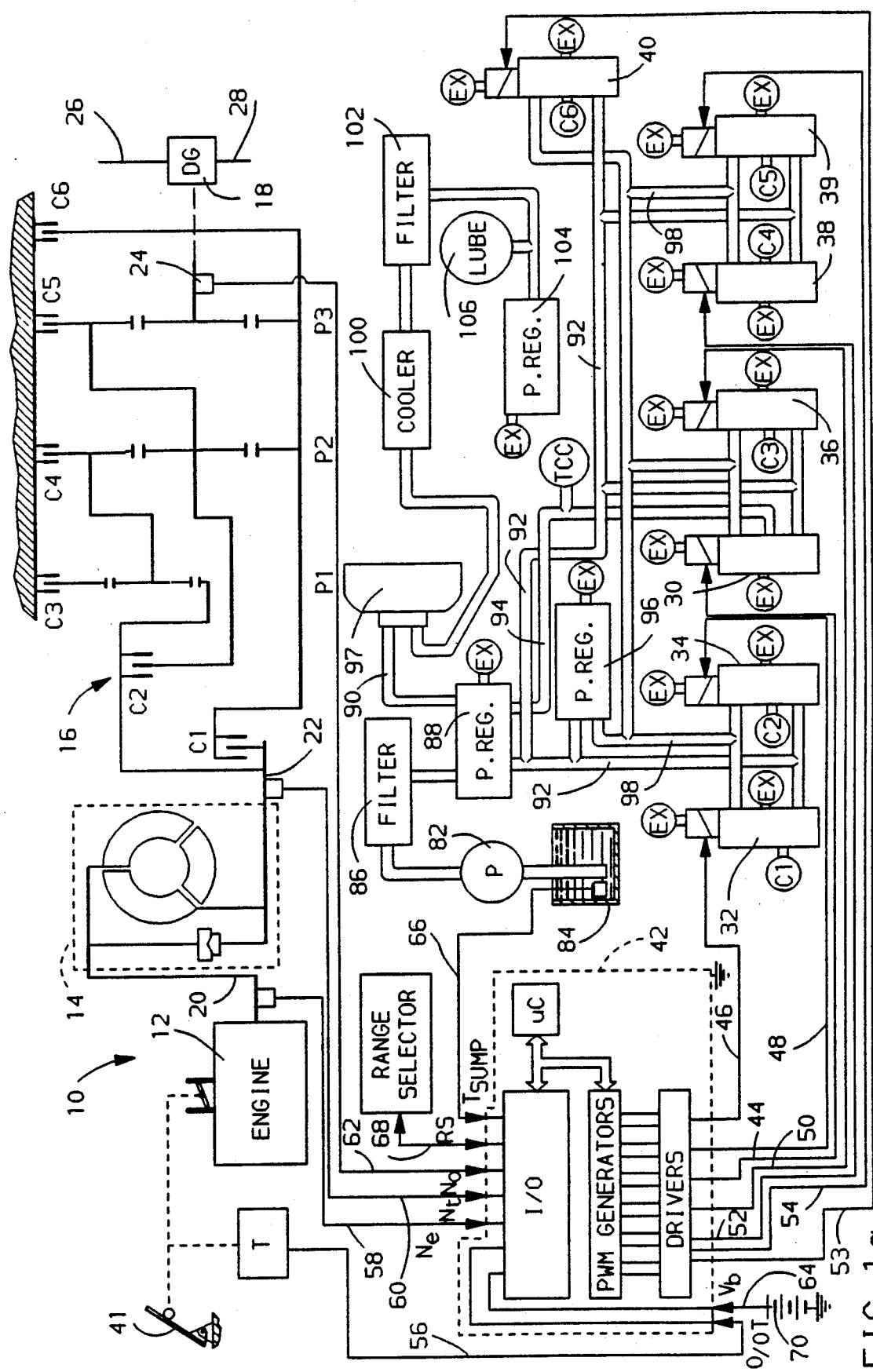
FIG. 1a is a system diagram of a fluid operated motor vehicle transmission, including several solenoid operated fluid pressure control valves and a computer-based control unit for carrying out the voltage control technique of this invention.

Referring now to the drawings, and more particularly to FIG. 1a, the reference numeral 10 generally designates a motor vehicle drive train including a throttled internal combustion engine 12, a fluidic torque converter 14, a seven-speed fluid operated power transmission 16 and a differential gear set (DG) 18. The engine 12 is connected to the torque converter 14 via shaft 20, the torque converter 14 is connected to the transmission 16 via shaft 22, the transmission 16 is connected to the differential gear set 18 via shaft 24 and the differential gearset is connected to a pair of drive wheels (not shown) via the prop shafts 26 and 28.

Gear shifts are accomplished by selectively engaging and disengaging brakes and clutches, herein called torque transmitting devices or clutches. These clutches are actuated by hydraulic pressure and upon engagement, require a fill time before torque is transmitted between a driving and a driven friction element.

The speed and torque relationships between the engine 12 and the drive wheels of the vehicle are controlled by a fluid operated torque converter clutch, designated TCC, and six fluid operated transmission clutches, designated C1–C6. The torque converter clutch TCC is selectively engaged by the solenoid operated control valve 30 to mechanically connect the impeller I and turbine T of torque converter 14. The clutches TCC, C1, C2, C3, C4, C5, C6 are selectively engaged and disengaged by the solenoid operated control valves 30, 32, 34, 36, 38, 39, 40, according to the diagram shown in FIG. 1b, to selectively establish a desired transmission speed ratio. That diagram shows that to upshift from Low to first range, clutches C3 and C6 are released and clutches C1 and C5 are engaged. The illustrated transmission gear set provides one reverse ratio and seven forward ratios. An operator manipulated accelerator pedal 41 positions the engine throttle for controlling the engine power output.

The operation of the solenoid operated control valves 30-40 is controlled by a computer-based control unit 42 via lines 44-54 in response to various input signals representative of system parameters. Such inputs include an engine throttle position signal %T on line 56, an engine output shaft speed signal Ne on line 58, a torque converter output shaft speed signal Nt on line 60, a transmission output shaft speed signal No on line 62, a system supply voltage signal Vb on line 64, a transmission fluid temperature signal Tsump on line 66 and an operator range selector position signal RS on line 68. The system voltage is supplied by the storage battery 70, and the input signals are obtained with conventional electrical transducers such as potentiometers, thermistors and magnetic speed pickups.

Internally, the control unit 42 comprises a number of conventional devices including a microcomputer (uC) with internal clock and memory, an input/output device (I/O) and an array of PWM generators (PWM) and drivers (DR). As indicated below, a PWM generator and a driver (DR) are dedicated to each solenoid control valve 30-40. The PWM outputs are delivered to the respective drivers (DR) and are used to energize the respective solenoid control valves. The duty cycle of the PWM outputs determine the hydraulic pressure supplied by the solenoid control valves, with a low percent duty cycle yielding a low pressure and a high percent duty cycle yielding a high pressure for a normally closed valve.

The hydraulic circuit of transmission 16 includes a positive displacement pump 82 for supplying pressurized hydraulic fluid from the sump or reservoir 84, to the clutches TCC and C1-C6 through various hydraulic and electro-hydraulic valving mechanisms. After passing through a main circuit filter 86, the fluid output of pump 82 is directed to a main pressure regulator valve 88 which develops regulated fluid pressures in lines 90 and 92.

The fluid in line 90, generally referred to as converter feed pressure, is directed through the torque converter 14, as schematically designated by the converter shell 97. After passing through a cooler 100 and cooler filter 102, the converter fluid is then regulated down to a lower pressure by the regulator valve 104 and directed to the transmission lube circuit, as designated by the bubble 106.

The fluid in line 92, generally referred to as main or line pressure, is supplied as an input to the clutch control valves 30-40, and also to the control pressure regulator valve 96. The control pressure regulator valve 96 develops a somewhat lower pressure in line 98, referred to herein as the control pressure, such pressure being directed to the solenoid of each control valve 30-40.

The fluid in line 94, referred to as the converter clutch pressure, is supplied directly by solenoid 30 to the torque converter clutch TCC to engage the same. This pressure is also supplied to the main regulator valve 88 to provide a lower regulated line pressure in the converter lock-up mode.

Figures 1B, 2:
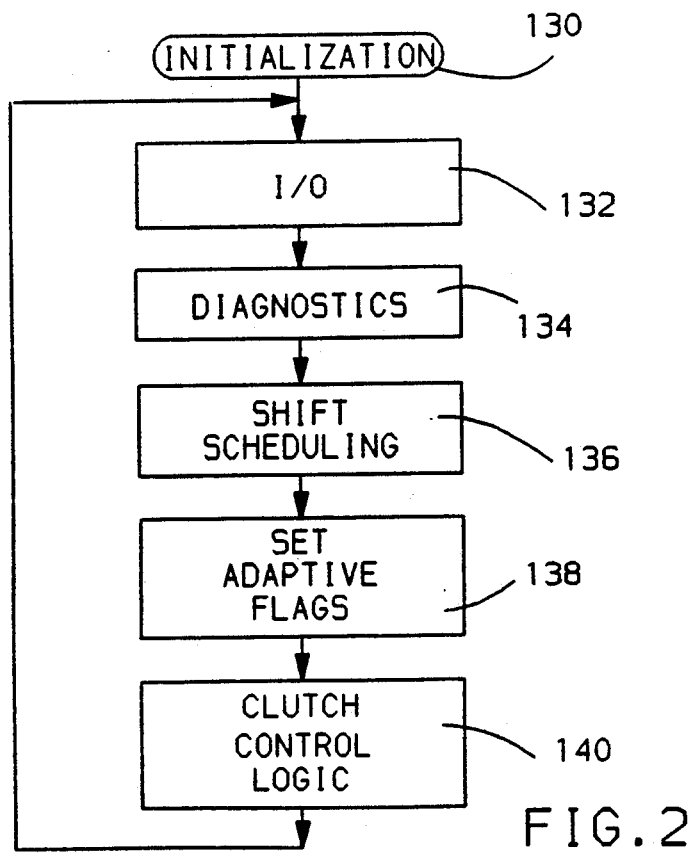

FIGs. 2, 3a-3b and 6-15 are flow diagrams representative of computer program instructions executed by the computer-based control unit 42 of FIG. 1 in carrying out the shift control technique of this invention. In the description of the flow diagrams other than FIG. 2, the functional explanation marked with numerals in angle brackets, <nn>, refers to blocks bearing that number.

FIG. 2 represents an executive or main loop program which directs the sequential execution of various subroutines. Block 130 designates a series of instructions executed at the initiation of each period of vehicle operation for setting the various timers, registers and variable values of control unit 42 to predetermined initial values. Thereafter, the blocks 132-140 are sequentially and repeatedly executed as indicated by the flow diagram lines. Block 132 reads the various input signal values and outputs the required control signals to the PWM generators and drivers for solenoid controlled valves 30-40. Blocks 134-138 contain diagnostic, shift scheduling, and adaptive flag logic. The clutch control logic block 140 analyzes the various system input signals described above in reference to FIG. 1a, develops pressure command signals PCMD for application to the solenoid operated control valves at the next execution of block 132, and computes adaptive corrections based on the adaptive flags at shift completion. Block 140 also effects pulse-width-modulation of the solenoid drive voltage to carry out the pressure commands for specific shift operations. Block 140 is detailed in the flow chart of FIGS. 3a-3b.

Figure 3A:
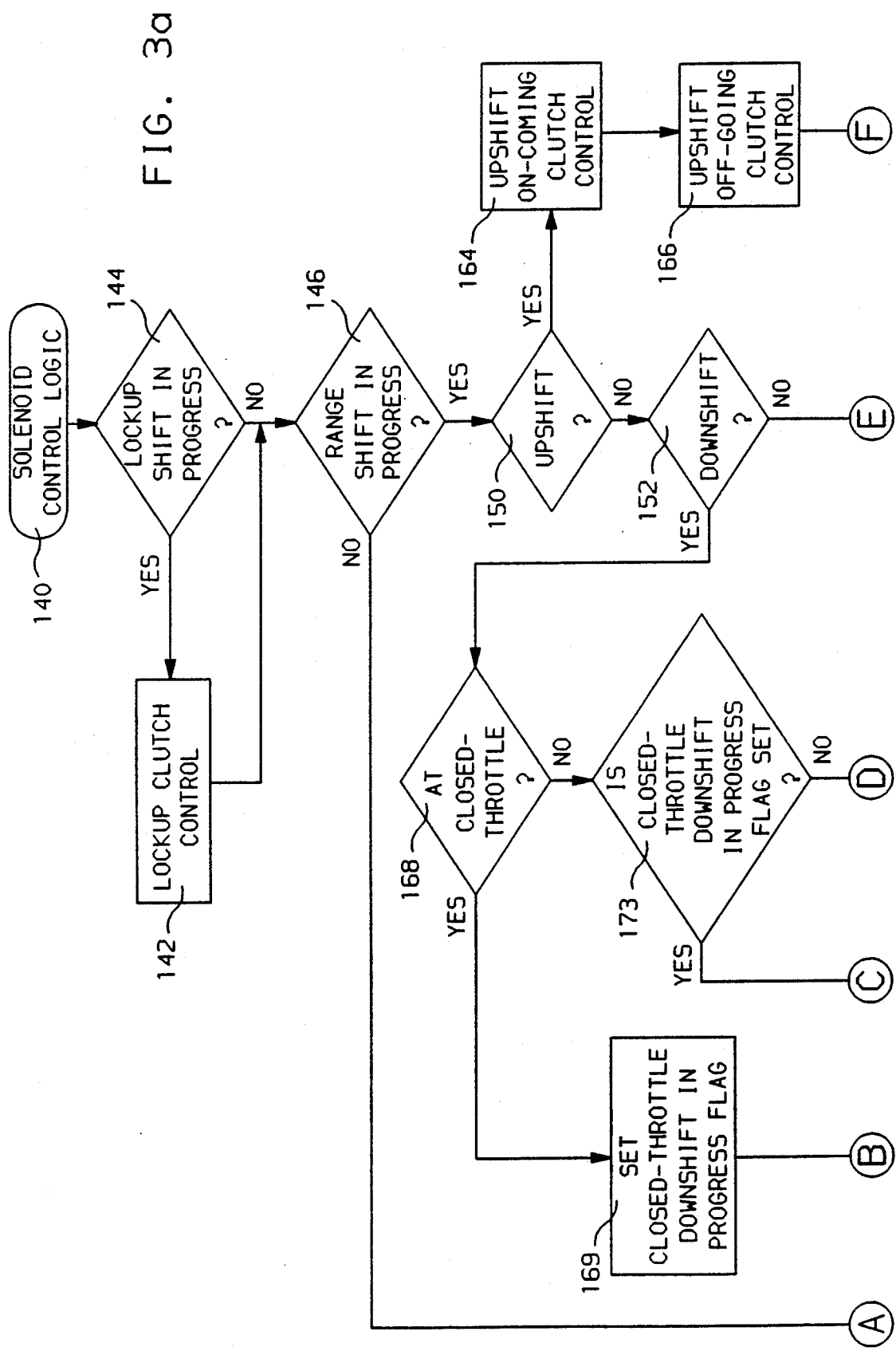
Figure 3B:
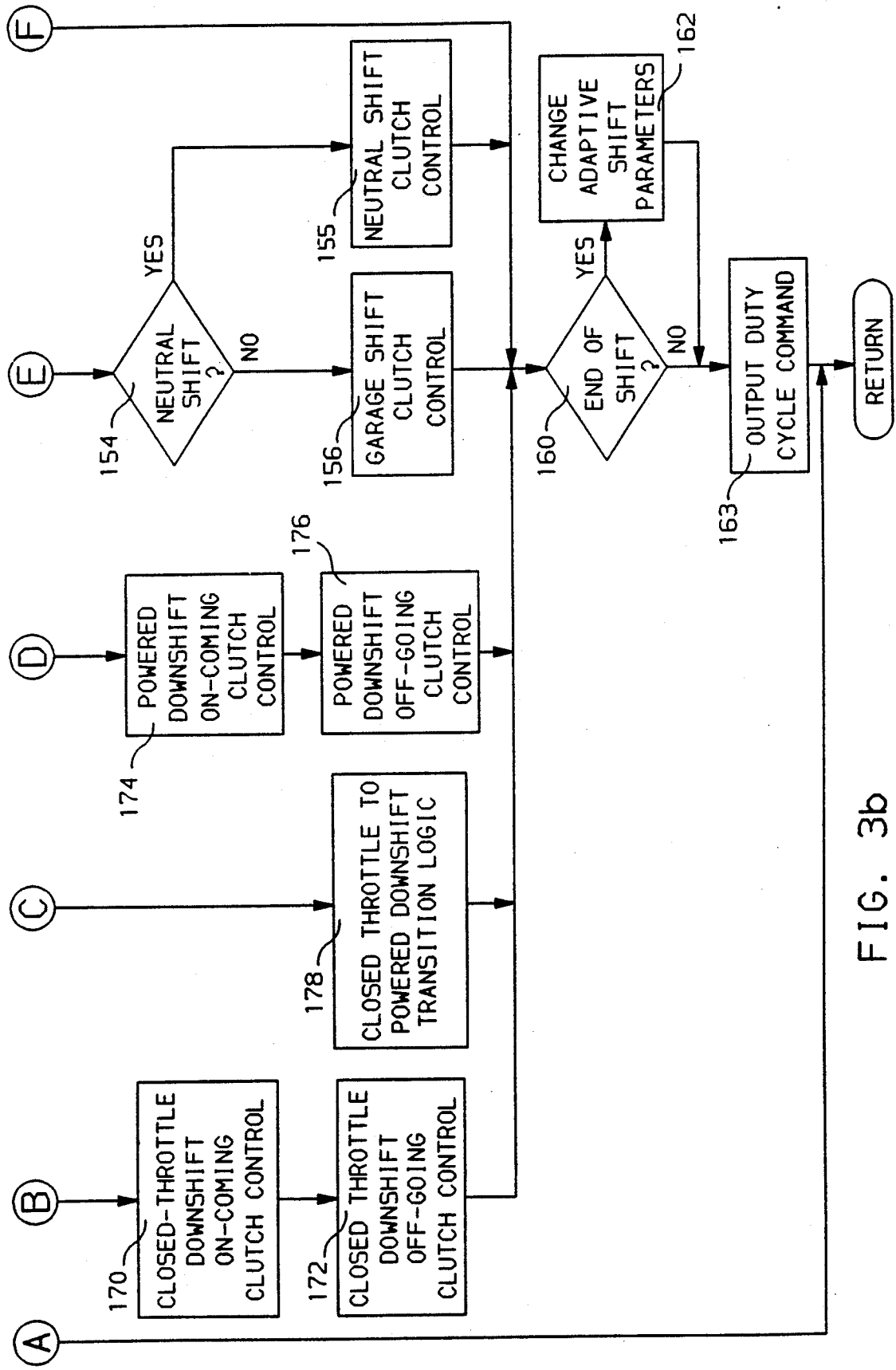

The flow diagram of FIGS. 3a-3b sets forth the program for making decisions as to the type of range shift in progress, if any, and determines the specific control for the on-coming and the off-going clutches. The program also checks whether a shift has performed within specifications, and if not, certain shift parameters are changed at shift completion according to predefined adaptive logic to correct the shift. First, lockup clutch control is executed <142> if a lockup shift is in progress <144>. Then it is determined (from the shift schedule) whether a range shift is in progress <146>. If not, the clutch control logic is exited. If a range shift is in progress <146>, it is determined whether it is an upshift <150>, a downshift <152>, a neutral shift <154>, or a garage shift <156>. A garage shift is a shift from neutral to either drive or reverse, or a shift from drive to reverse or from reverse to drive. The control flows from either the upshift, downshift, neutral shift or the garage shift block to the end-of-shift test <160>. Once the shift is completed <160>, adaptive shift parameters are changed if required <162> and the duty cycle command is output <163>. If the shift has not ended <160>, the duty cycle command is output <163> before returning to the main loop of FIG. 2.

If an upshift is indicated <150>, the upshift on-coming clutch control <164> and the upshift off-going clutch control <166> are activated. If a downshift is indicated <152>, it is next decided whether it is a closed throttle downshift or a powered downshift <168>. If it is closed throttle, a closed throttle in progress flag is set <169>, the closed throttle on-coming clutch control is activated <170> and the closed throttle off-going clutch control is activated <172>. If the downshift is not at closed throttle <168>, the closed throttle flag is checked <173>. If the flag is not set, the powered downshift on-coming clutch control <174> and the powered downshift off-going clutch control <176> are activated. If the closed throttle flag is set <173>, the throttle opened during the course of the closed throttle downshift and a transition to powered downshift may be necessary: in such case, the appropriate transition logic is invoked <178>. If the shift is a neutral shift <154>, the neutral shift clutch control executes shifts from drive to neutral or from reverse to neutral <155>.

Each control phase operates by setting pressures, pressure increments, times or other values to predefined calibrated values which are herein generally called "set", "preset", "given" or "certain" values. Each such value is chosen from a table of calibrated values for each specific transmission condition, throttle range and shift type. Thus, different values are supplied for upshift, downshift, etc. as well as each range shift, e.g., 1-2, 2-1, 4-3, 5-4, etc. Converter and lockup modes may also require separate sets of calibration values.

Figure 4:
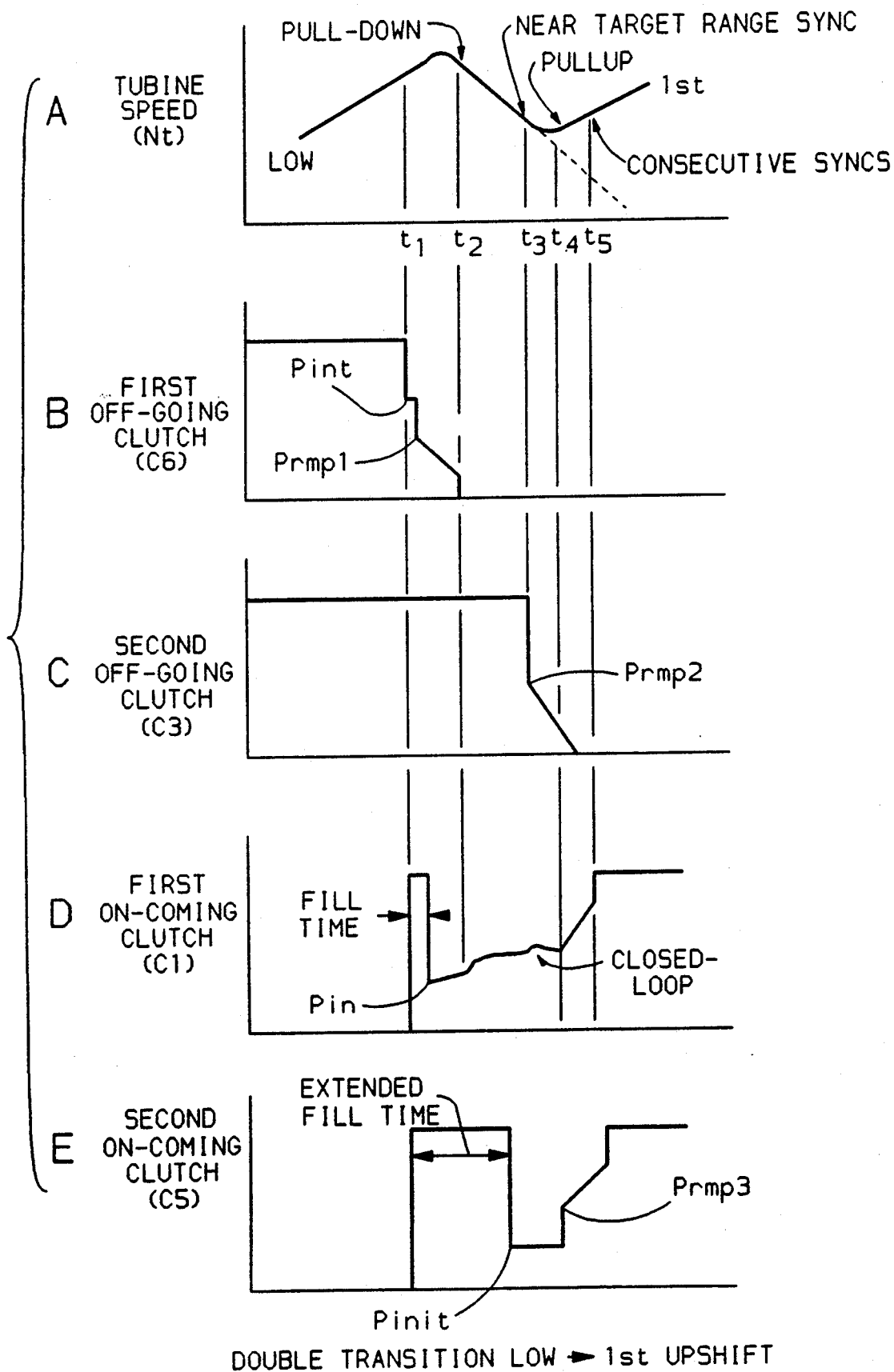
FIG. 4, graphs A, B, C, D and E, illustrate turbine speed, first and second off-going pressure commands and first and second on-coming pressure commands, respectively, for double transition shifting according to the invention.

FIG. 4, graphs A, B, C, D and E, detail the controlled clutch pressures for an upshift from low to first range, as well as the turbine speed or input speed. Graph A is a graph of turbine speed versus time, graph B shows the commanded pressure versus time for the first off-going clutch C6, graph C shows the commanded pressure versus time for the second off-going clutch C3, graph D shows the commanded pressure versus time for the first on-coming clutch C1, and graph E shows the commanded pressure versus time for the second on-coming clutch C5. The graph A curve is typical for the case of increasing vehicle speed prior to shift initiation at time t1, and indicates the turbine speed Nt during the low range, the speed decrease during shifting, and increase again at a lower level after shifting to first range. The reduction of the turbine speed is due to the slowing action of the on-coming clutch, causing slip of the off-going clutch, and is indicative of "turbine pulldown". Turbine pulldown is detected at time t2 by sensing when the turbine speed falls a set amount below the product of the output speed No and the first range speed ratio SR1. The speed after shifting (after time t5) is "synchronous speed"; i.e., the turbine speed (Nt) equals the output speed No times the first range speed ratio SRI, or Nt =(No * SR1). The time t3 when the turbine speed is near synchronous speed is determined by Nt<(No * SR1)+K1, where SR1 is the speed ratio of first range and K1 is a constant. The time t4 marks the turbine pullup and is defined as Nt>Ntmin+K2, where Ntmin is the minimum value of turbine speed recorded during the time following the detection of a near sync condition and K2 is a constant. The time t5 is the end of the shift as determined by synchronous speed being detected in a set number of consecutive computer control loops.

Referring to graphs B, D and E, it may be observed that initially, at the time t1 of the shift command, the pressure commands for the on-coming clutches C1 and C5 are set to the maximum pressure value to begin filling the clutch cavities. The pressure on off-going clutch C6 is initially reduced to an intermediate value, Pint, for a brief time, is then reduced to an initial value Prmp1, and is then ramped down until off-going clutch slip (or turbine pulldown) is detected (time t2), and then dropped to zero. The brief intermediate value, Pint, is effective to reduce clutch pressure undershoot caused by solenoid dynamics. For the first on-coming clutch, C1, graph D shows that maximum pressure is commanded for a fill time. The fill time allows nearly complete stroking of the clutch plates and obtains clutch torque capacity. Then, the command pressure drops to an initial value, Pin, and ramps up slowly until it causes turbine pulldown at time t2. The combination of the on-coming upward ramp and the off-going downward ramp results in a torque transition from the first off-going clutch, C6, to the first on-coming clutch, C1. The second on-coming clutch, C5, as shown in graph E, enters an extended fill time at t1 and then drops to a standby initial pressure Pinit until pullup is detected at time t4. Thus, from time t2 through t4, clutches C1 and C3 are engaged, at least in part, to satisfy the FIG. 1b condition for third range. This enables power to be delivered by the transmission during the shift. It also enables the turbine speed to be pulled down to a synchronous speed for first range.

Figure 5:
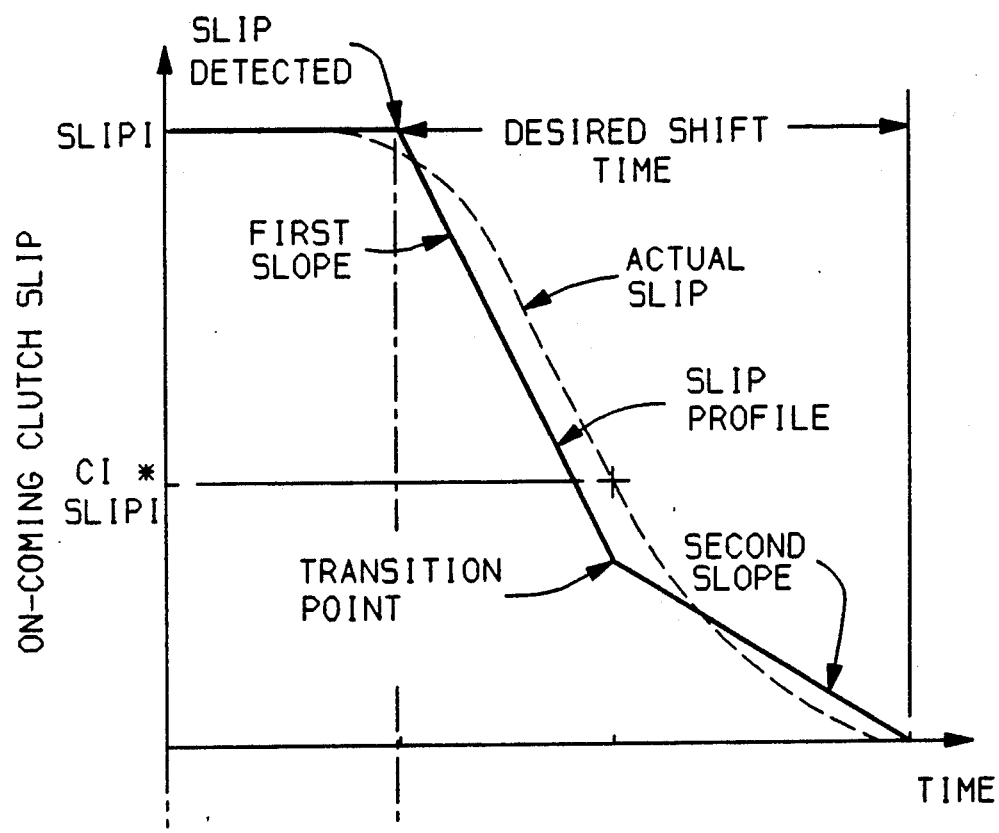
FIG. 5 is a slip diagram for the closed-loop operation of an on-coming clutch according to the invention.

At time t2 the first off-going clutch C6 is commanded to zero pressure and the first on-coming clutch C1 enters a closed-loop control period, wherein the pressure is adjusted to maintain the on-coming clutch C1 slip close to a calculated slip profile as described below in reference to FIG. 5. When the turbine speed, Nt, reaches near synchronous speed at time t3, the pressure command on the second off-going clutch C3 is dropped to a beginning value Prmp2, whereafter it is ramped to zero pressure. The closed-loop control of on-coming clutch C1 continues until off-going clutch C3 releases at time t4 to cause turbine speed pullup. At that point, the pressure command for on-coming clutch C1 is ramped up to complete its engagement. At the same time, the pressure command for on-coming clutch C5 is stepped up to an initial engagement pressure Prmp3, and then ramped up to complete engagement. Maximum pressure is applied to both on-coming clutches to end the shift when synchronization is detected for several consecutive times at t5.

The upshift process has several features which contribute to smooth and efficient operation. Power is transferred to the output during the process of turbine speed pulldown. Events such as pulldown, pullup and target range synchronization are used to control clutch application and release, thereby providing controlled timing of the clutches. The on-coming and off-going pressure ramp commands reduce clutch timing sensitivity to the initial pressure commands. Thus, variations in clutches due to temperature or other factors do not impose critical demands on the timing of torque transition because the ramps can continue for a variable time, subject to a limit value. Also, the immediate release of the first off-going clutch following pulldown detection reduces clutch tie-up which might result in a braking action. The closed-loop control of the on-coming clutch reduces shift variation and the end-of-shift torque disturbance.

The closed-loop control is better explained with reference to FIG. 5 which shows the on-coming slip speed profile in solid lines and actual slip speed in dashed lines. Slip speed is determined by comparing the turbine speed to the output speed. Specifically, slip speed is the absolute difference (times a conversion factor K3) between turbine speed and the product of the output speed and the speed ratio of the target range or SLIP=K3 * ABS[Nt−(No * SR1)]. Thus, as soon as a shift command is issued, there is a slip speed across the on-coming clutch. The initial slip speed, SLIPI, is the slip speed value at the detection of turbine pulldown. The slip speed profile begins at that point and decreases at a fixed rate, called the first slope. Then at a determined point, the rate reduces to a second slope. The slopes are chosen so that, ideally, the actual slip speed can be made to smoothly go to zero within a given time period. The second slope is less steep than the first slope, and reduces end of shift torque disturbance by more closely matching the acceleration rates on both sides of the first on-coming clutch. By using on-coming clutch slip speed as the control target, both turbine and output speeds are taken into account when controlling the shift duration.

To determine the slopes of the slip profile, three constants C1, C2 and C3 are defined. The constant C1 is a fraction of SLIPI at which the second slope begins; i.e., if SLIP≦C1*SLIPI, the slope changes to the second slope. The constant C2 is the desired time to utilize the first slope. The constant C3 is the desired overall closed-loop time. The constants C2 and C3 are used only for the slope calculation and not for direct timing purposes. The first and second slopes SLOPE1, SLOPE2 are defined as SLOPE1=[SLIPI−(C1*SLIPI)]/C2; and

SLOPE2=C1*SLIPI/(C3−C2).

The arrival at synchronization speed is determined by making several measurements in consecutive control loops. This assures that true synchronization has been achieved and maintained. If synchronization is assured, full clutch pressure is immediately applied.

Figure 6:
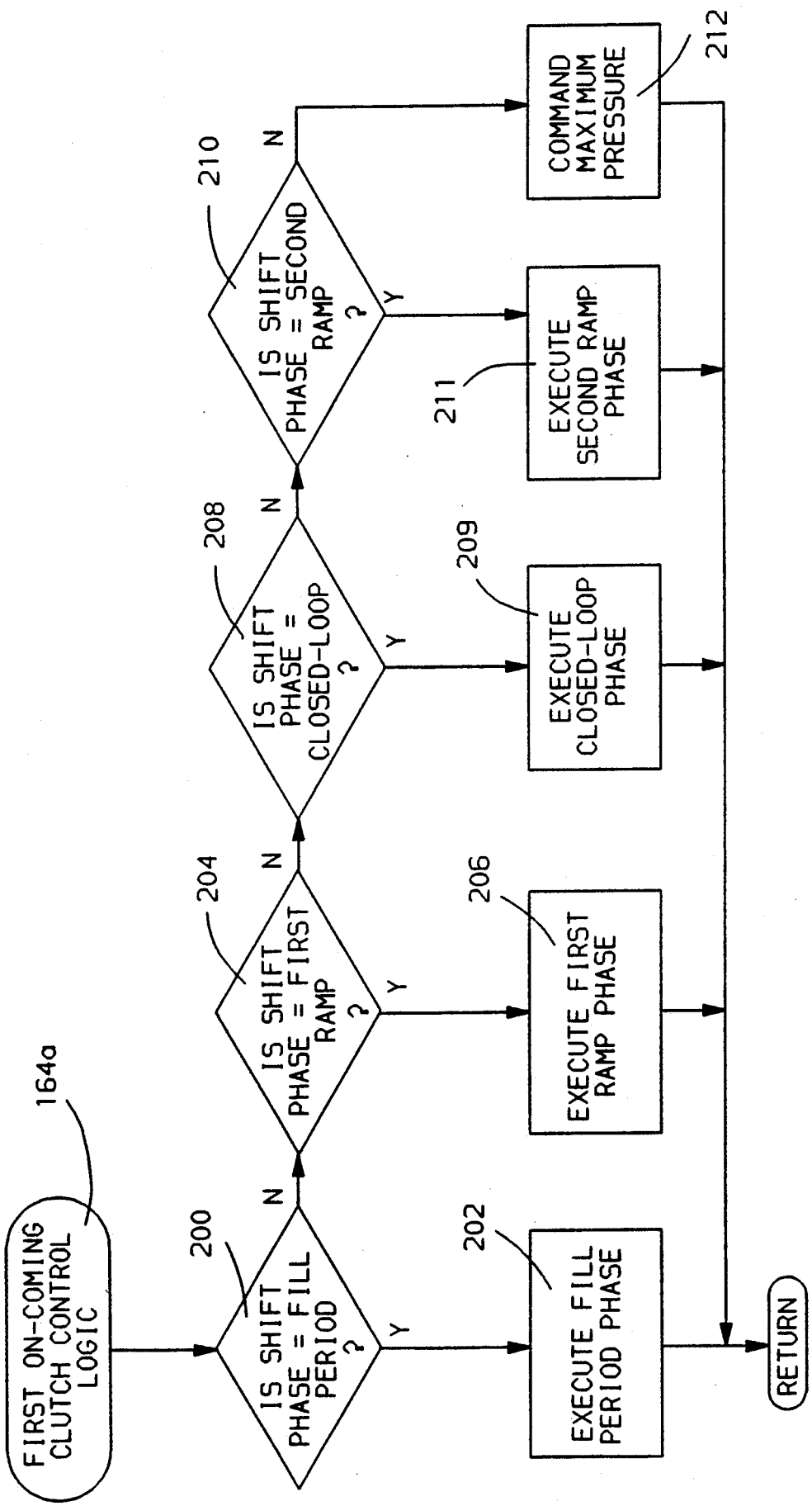
FIGS. 6 through 9 are flow diagrams for the first on-coming clutch control logic, according to the invention.

The flow charts of FIGS. 6–15 illustrate the control logic incorporated in the program for shift control. In these charts, SHIFT PHASE is a pointer for indicating the stage of shift process for each clutch. In FIG. 3, the block 164 effects the on-coming clutch control for both on-coming clutches C1 and C5. FIG. 6 shows the logic flow for the first on-coming clutch control, and is designated 164a. If SHIFT PHASE is FILL PERIOD <200>, the Fill Period phase is executed <202>. If SHIFT PHASE is in First Ramp <204>, the First Ramp routine is run <206>. If SHIFT PHASE equals CLOSED-LOOP <208>, the Closed-Loop phase is executed <209>. If SHIFT PHASE equals SECOND RAMP <210>, the Second Ramp phase is executed <211>. If SHIFT PHASE is none of these, the maximum pressure is commanded <212>.

Figure 7:
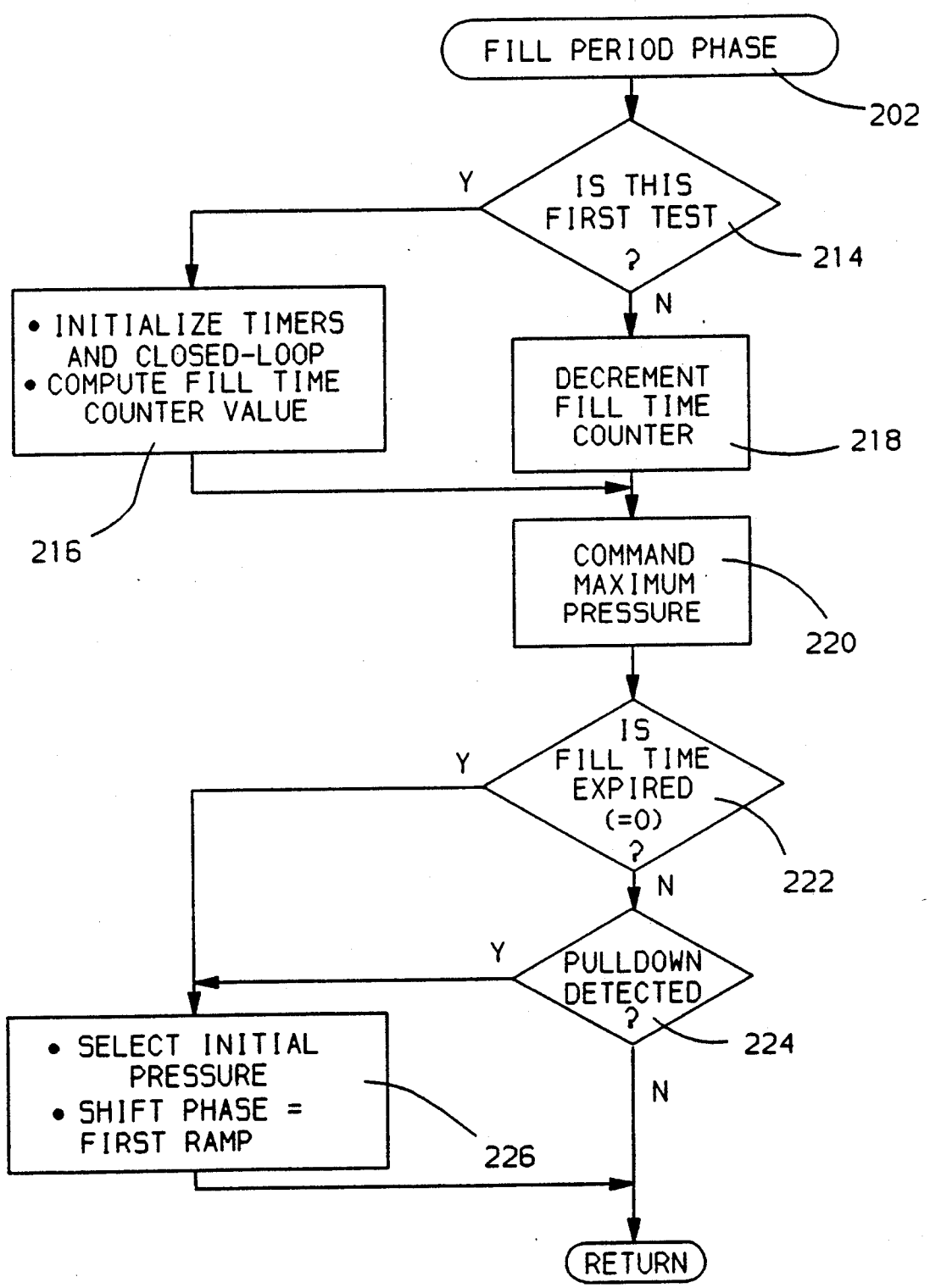

FIG. 7 shows the Fill Period phase logic 202. If it is the first time through the loop <214>, timers and closed-loop parameters are initialized and a FILL TIME counter value is computed <216>: if it is not the first time through the loop, the FILL TIME counter is decremented <218>. Next, the maximum pressure is commanded <220> and the routine returns to the main program. However, if the FILL TIME counter has decremented to zero <222>, or pulldown is detected <224>, initial pressure is selected and the SHIFT PHASE is set to FIRST RAMP <226>.

Figure 8:
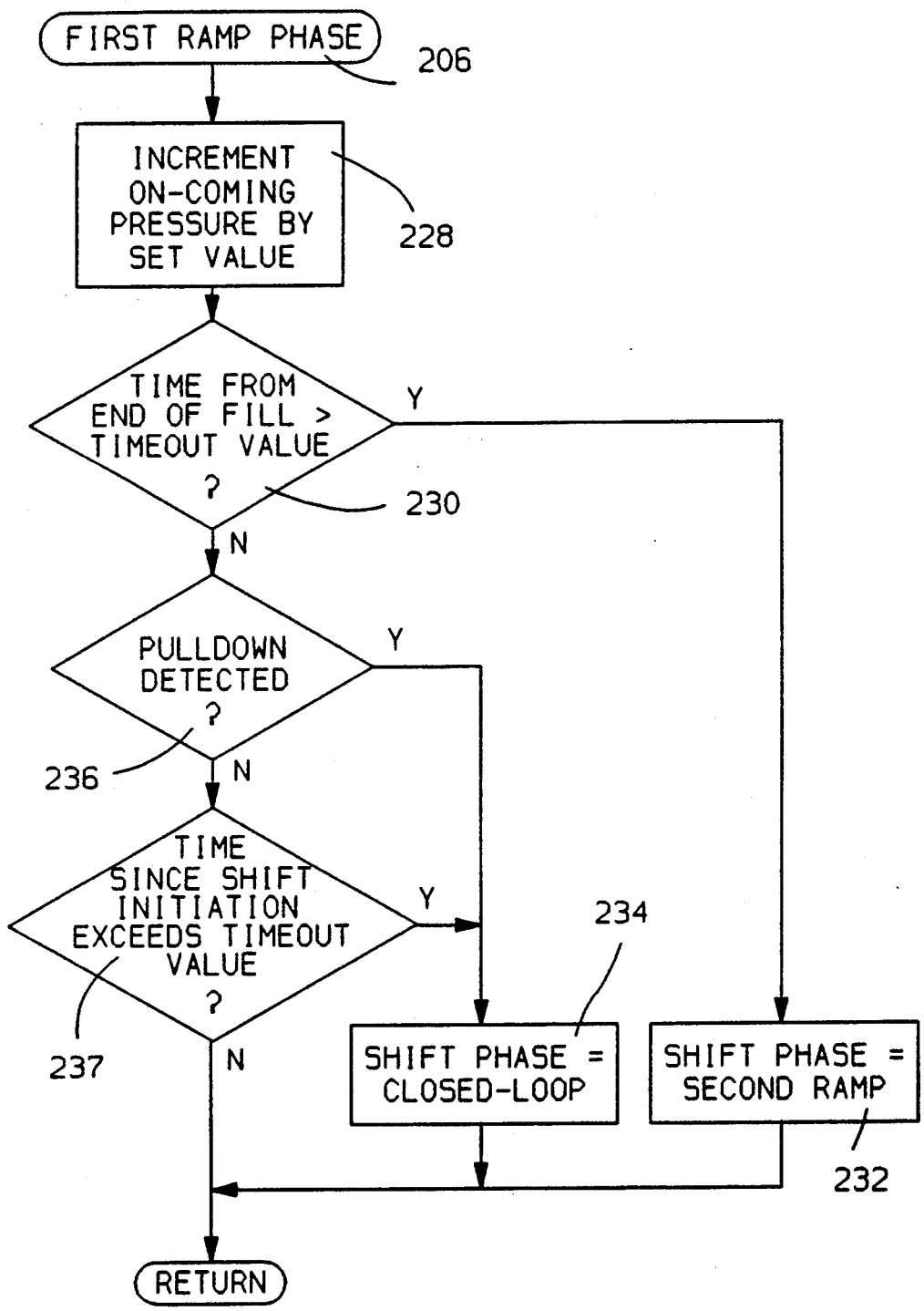

In the First Ramp phase 206, shown in FIG. 8, the on-coming pressure is incremented by a set value <228>, and if the time from the end of fill is greater than a timeout value <230>, SHIFT PHASE is set to SECOND RAMP <232>. If not, SHIFT PHASE is set to CLOSED-LOOP <234> if pulldown is detected <236>, or the time since shift initiation exceeds a timeout value <237>. Otherwise the program continues to the main loop.

Figure 9:
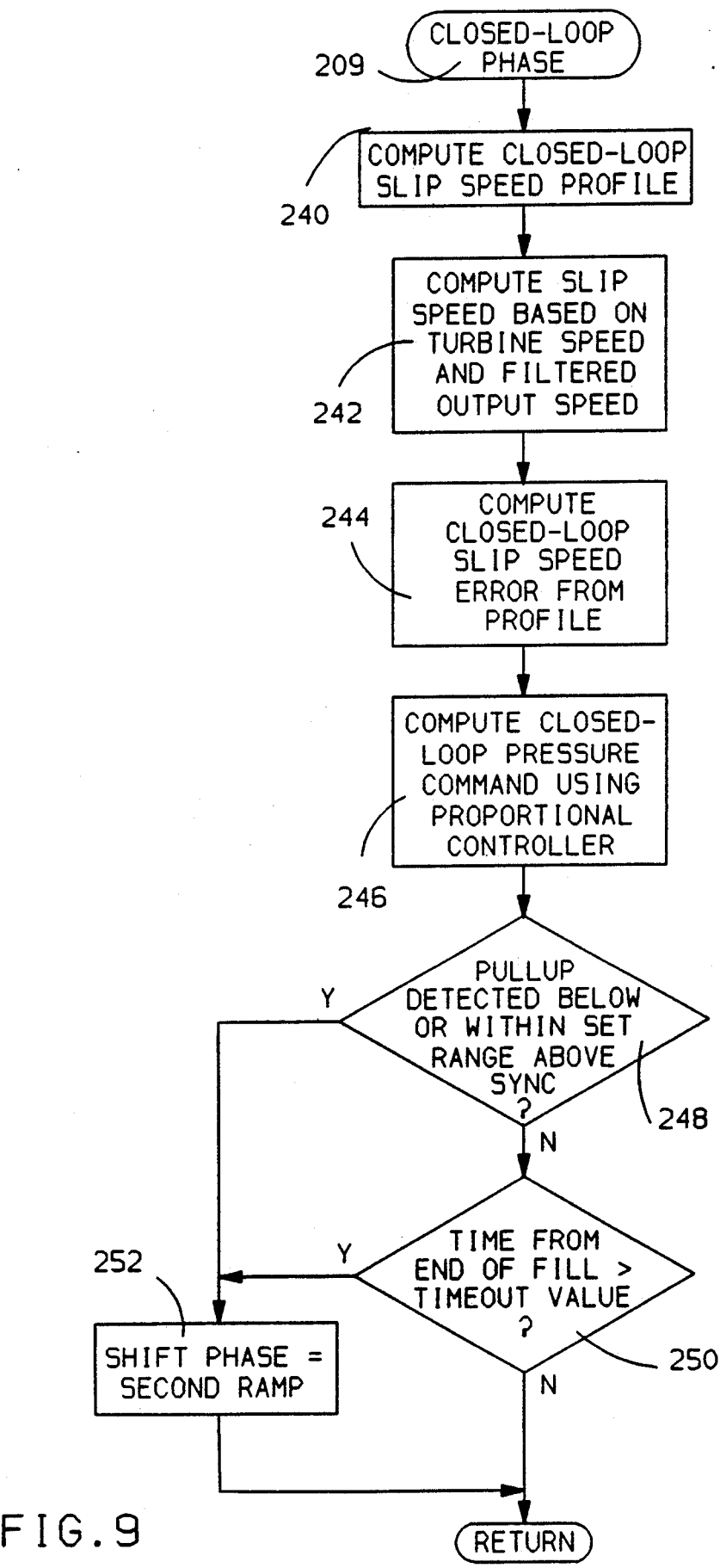

FIG. 9 shows the Closed-Loop phase 209, wherein the closed-loop slip speed profile is calculated <240>, the slip speed is computed based on turbine speed, filtered output speed, and the target speed ratio <242>, the slip speed error is calculated <244>, and the closed-loop pressure command is computed using a proportional controller <246>. Then, if pullup is detected (t4) below or within a set range above sync <248>, or if the time from the end of fill is greater than a timeout value <250>, SHIFT PHASE is set to SECOND RAMP <252>. The Second Ramp routine (not shown) increments the on-coming pressure by a set ramp value and then sets SHIFT PHASE to END if a set number of consecutive target range syncs are detected or if the maximum pressure command has been reached.

Figure 10:
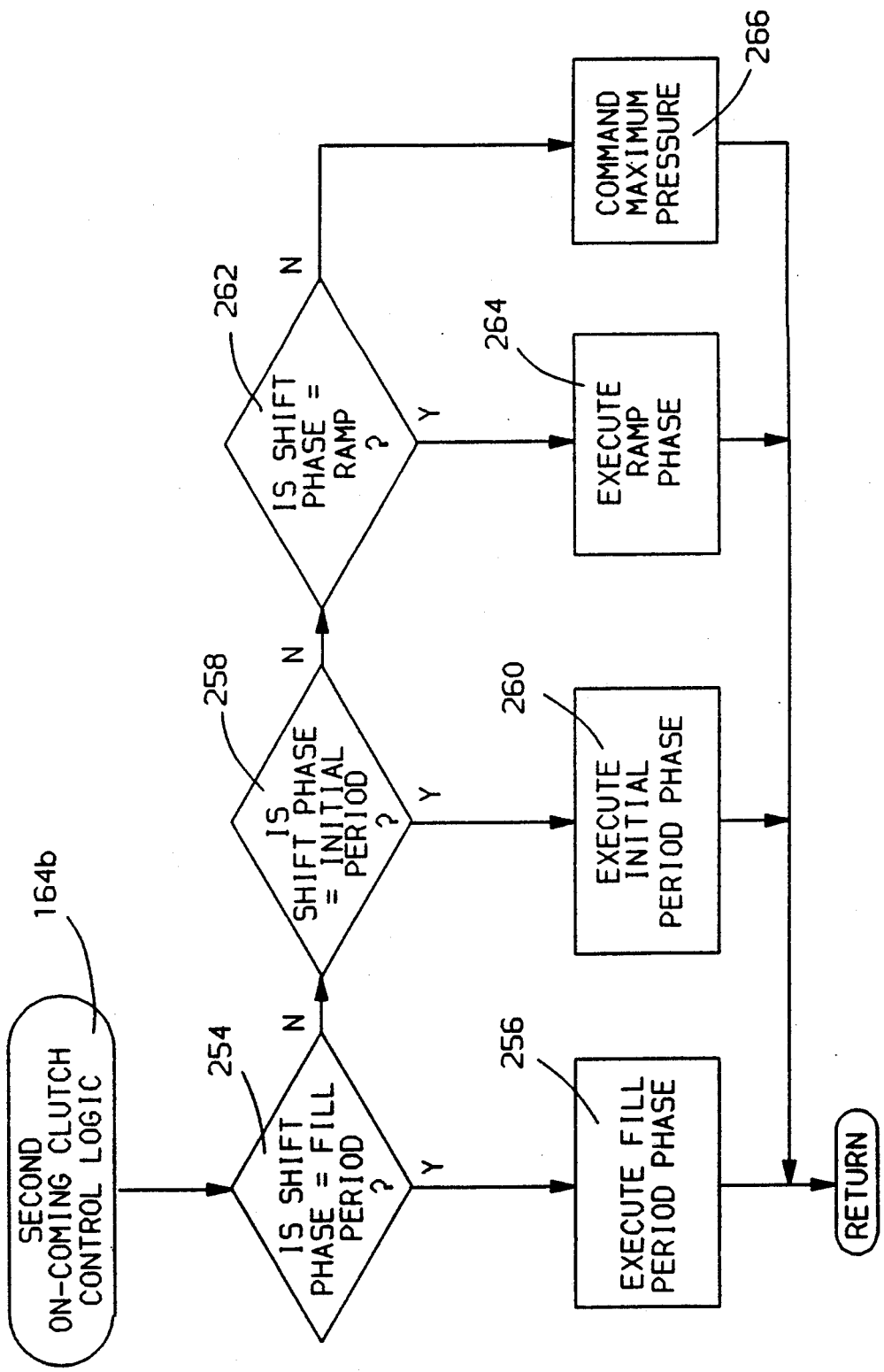
FIGS. 10 and 11 are flow diagrams for the second on-coming clutch control logic, according to the invention.

The second on-coming clutch control logic diagram, designated 164b, is shown in FIG. 10. If SHIFT PHASE is equal to Fill Period <254>, the Fill period phase is executed <256>. If SHIFT PHASE equals INITIAL PERIOD <258>, the initial period phase is executed <260>. If SHIFT PHASE is set to RAMP <262>, the Ramp phase is executed <264>. If SHIFT PHASE equals none of these, the maximum pressure is commanded <266>.

Figure 11:
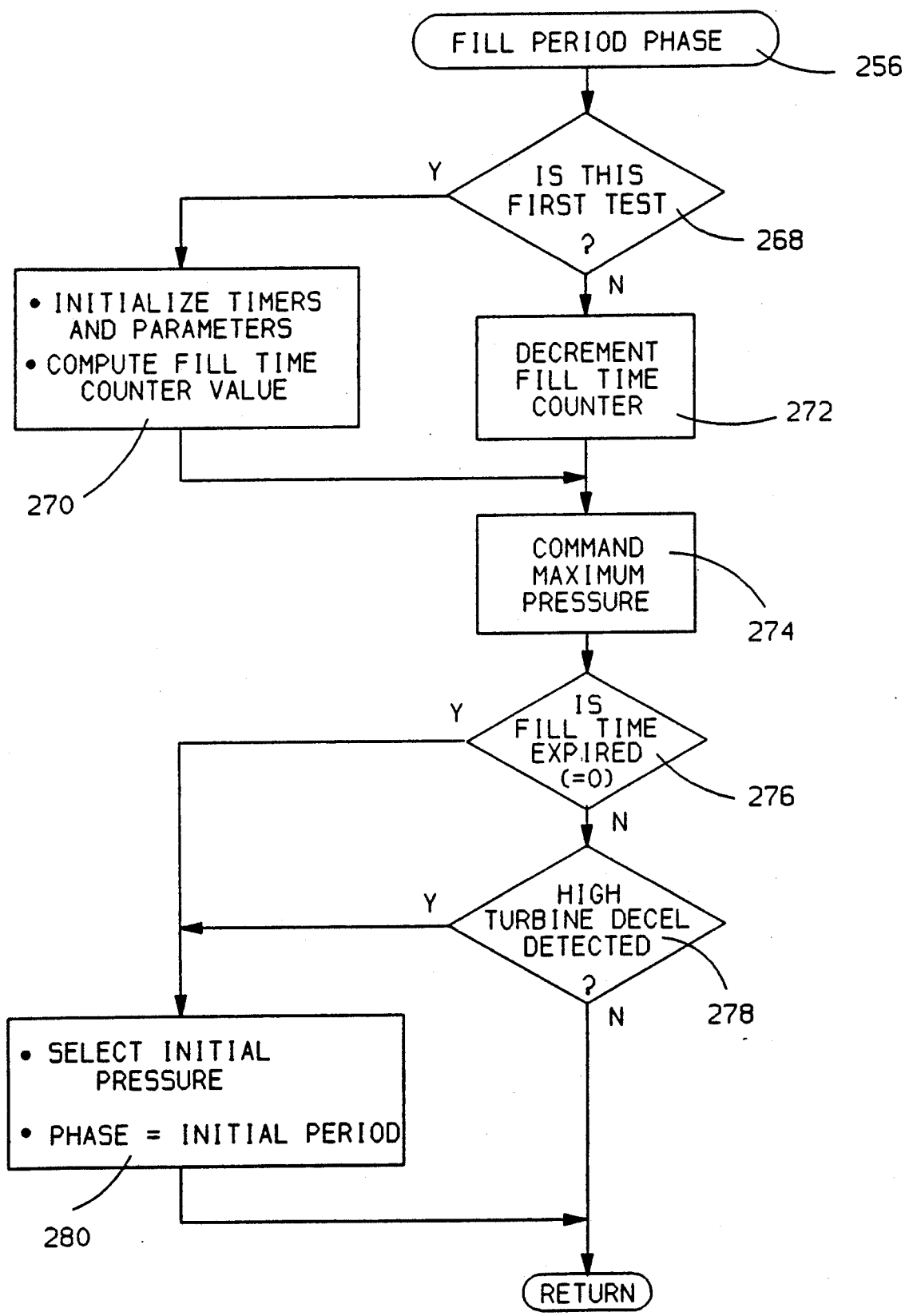

In the Fill Period phase 256, as shown in FIG. 11, if it is the first time through the loop <268>, timers and parameters are initialized and the FILL TIME counter value is computed <270>. If it is not the first time through the loop, the FILL TIME counter is decremented <272>. Next, the maximum pressure is commanded <274> and the routine returns to the main program. However, if the fill time counter has decremented to zero <276> or a high turbine deceleration is detected <278>, initial pressure is selected and SHIFT PHASE is set to INITIAL PERIOD <280>. The deceleration test assures that if the clutch fills enough to assume torque capacity and begins to affect turbine speed, the pressure will be reduced to a standby level or initial pressure. The Initial Period phase (not shown) holds the pressure at the selected value until pullup is detected below sync or within a set value above sync (t4); then a clutch pressure value, Prmp3, for the second on-coming clutch is commanded and SHIFT PHASE is set to RAMP. The Ramp phase (not shown) increments the on-coming pressure command by a set value in each control loop. If a set number of consecutive syncs is detected (t5), or if the maximum pressure is reached, SHIFT PHASE is set to END to complete the shift by commanding maximum pressure <266>.

Figure 12:
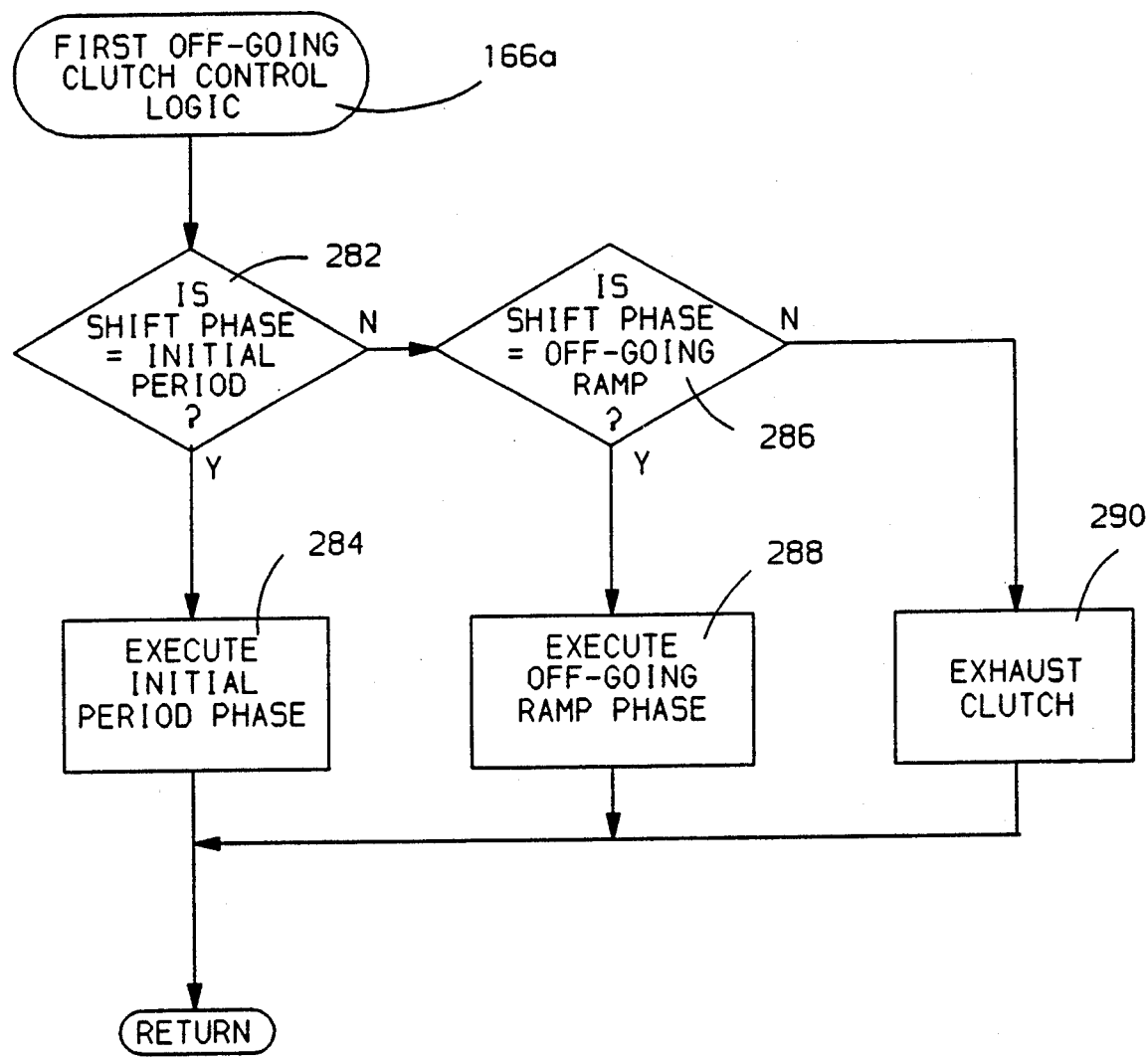
FIGS. 12 and 13 are flow diagrams for the first off-going clutch control logic, according to the invention.

The off-going clutch control block 166 of FIG. 3 includes the first off-going clutch control logic, designated 166a, and second off-going clutch control logic, designated 166b. The logic diagram for the first off-going clutch C6 is shown in FIG. 12. If SHIFT PHASE equals INITIAL PERIOD <282>, the Initial Period phase is executed <284>. If SHIFT PHASE is set to OFF-GOING RAMP <286>, the Off-going Ramp routine is executed <288>. Otherwise, the clutch is exhausted <290>.

Figure 13:
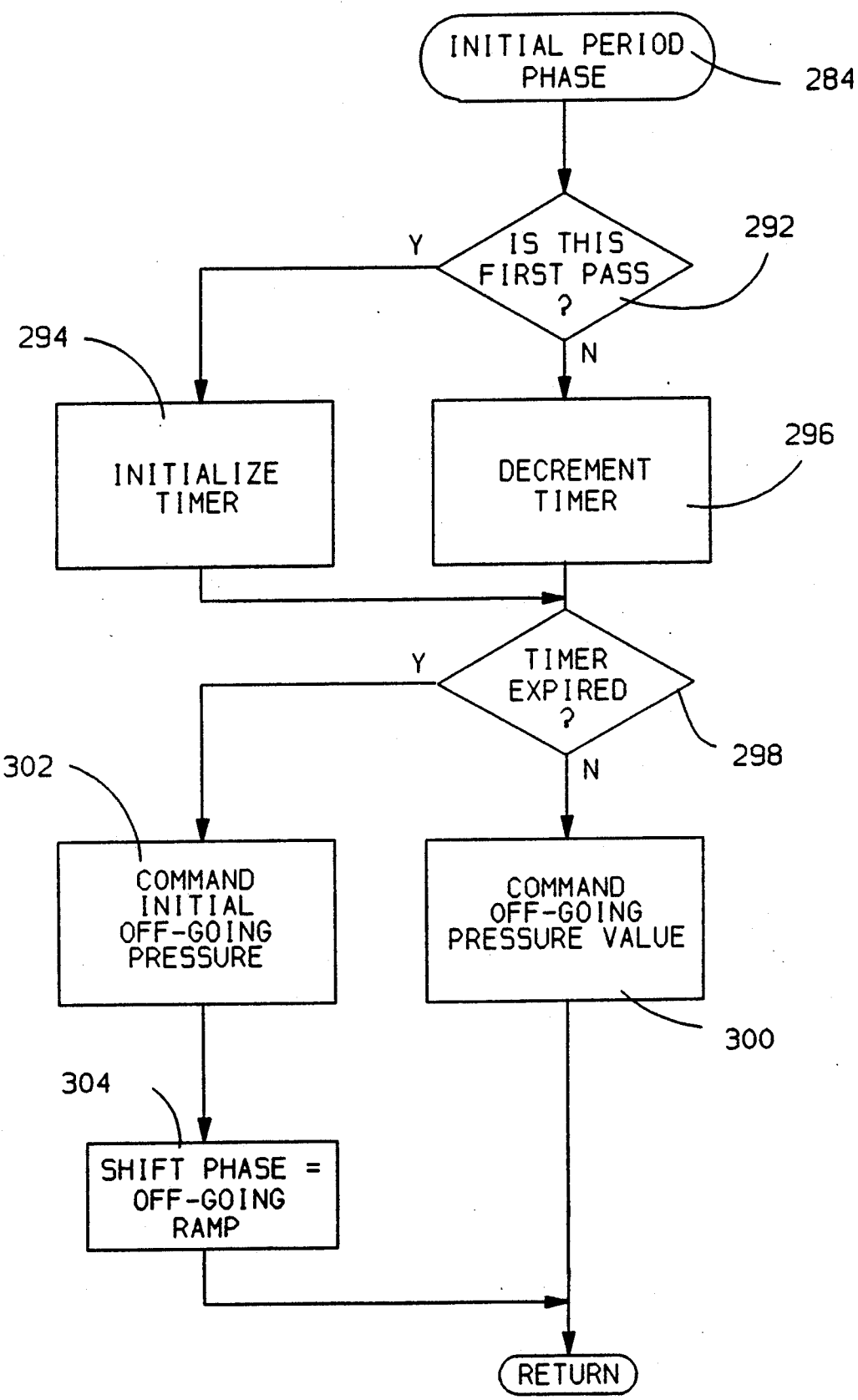

The initial period phase 284 diagram is shown in FIG. 13. If it is the first time through the loop <292>, a timer is initialized <294>, and otherwise the timer is decremented <296>. If the timer has not expired <298>, an intermediate pressure value P-int is commanded (t1) <300>. If the timer has expired <298>, an initial off-going pressure Prmp1 is commanded <302>, and SHIFT PHASE is set to OFF-GOING RAMP <304>. In the Off-going Ramp phase (not shown), the pressure is decremented a set amount in each control loop until the SHIFT PHASE for the first on-coming clutch logic is set to CLOSED-LOOP (t2), whereupon SHIFT PHASE for the first off-going clutch logic is set to END to cause the clutch C6 pressure to exhaust <290>.

Figure 14:
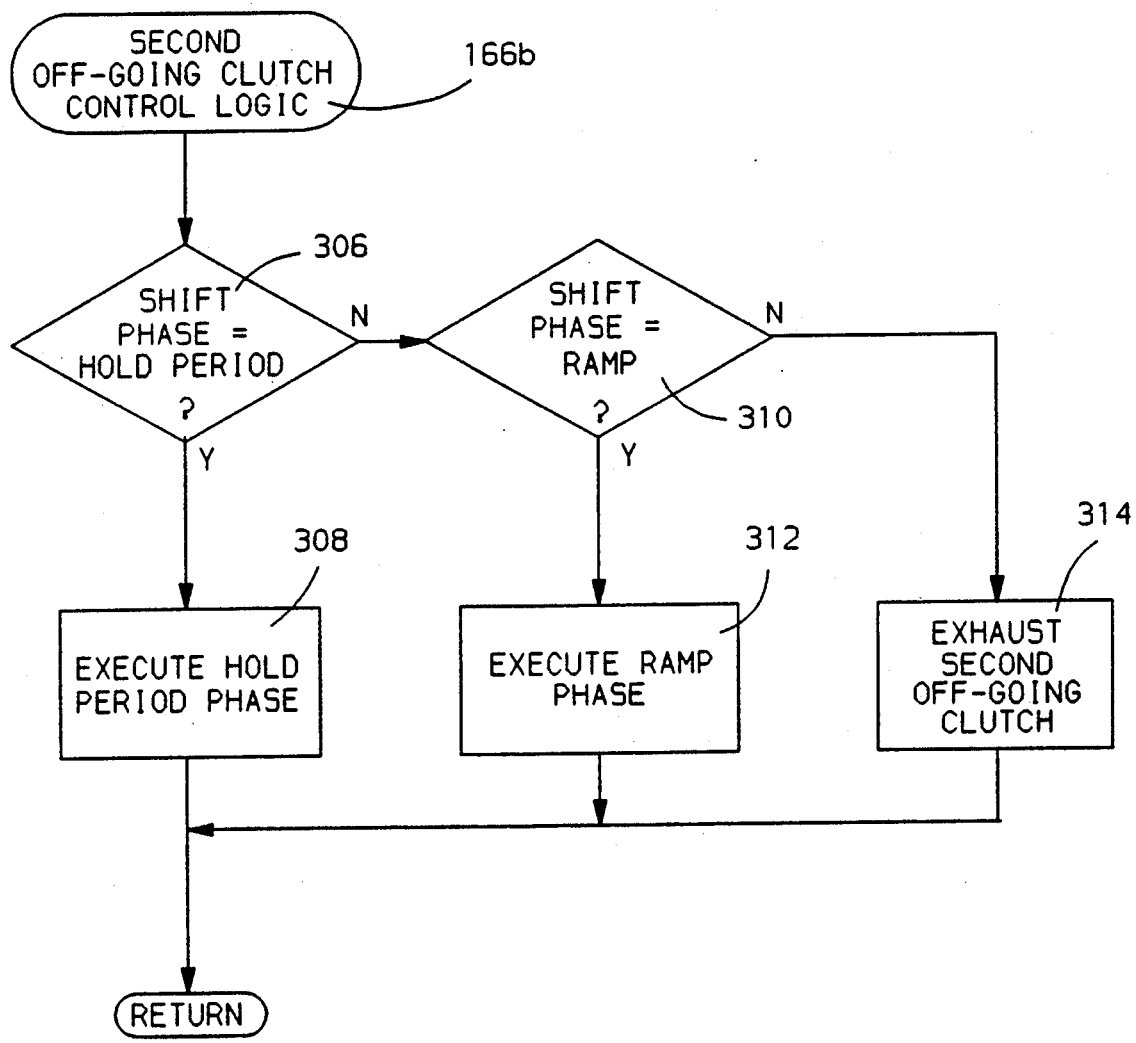
FIGS. 14 and 15 are flow diagrams for the second off-going clutch control logic, according to the invention.
Figure 15:
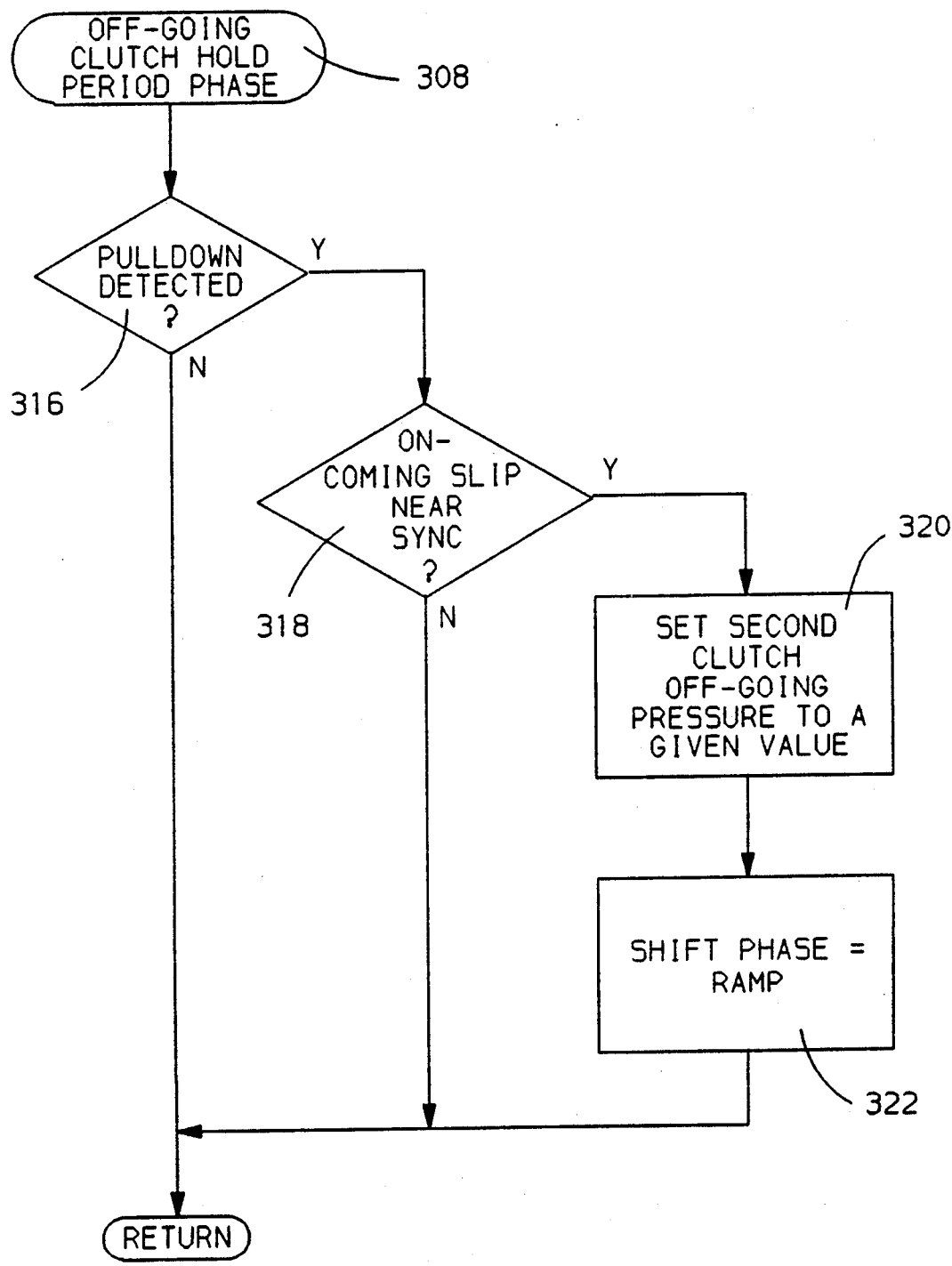

FIG. 14 shows the second off-going clutch control diagram 166b. If SHIFT PHASE equals HOLD PERIOD <306>, the Hold Period phase is executed <308>. If SHIFT PHASE equals RAMP <310>, the Ramp routine is run <312>. Otherwise, the second off-going clutch is exhausted <314>. As revealed in the Hold Period phase routine of FIG. 15, the pressure of clutch C3 is initially unaffected. When pulldown is detected <316> and the on-coming slip is near sync (t3) <318>, the second off-going clutch pressure command is set to a given value Prmp2 to begin a ramp down <320> and SHIFT PHASE is set to RAMP <322>. In the Ramp phase (not shown), the second off-going pressure command is decremented in each control loop until the pressure command equals zero or a timeout limit is exceeded and then SHIFT PHASE is set to END to exhaust the clutch C3 <314>.

While this invention has been described in reference to the illustrated embodiment, it is expected that various modifications will occur to those skilled in the art. In this regard, it will be understood that systems incorporating such modifications may fall within the scope of this invention, which is defined by the appended claims.

The embodiments of the invention in which an exclusive property or privilege is claimed are defined as follows:

1. In a vehicular automatic transmission having an input and an output, a turbine connected to the input to couple driving torque thereto, in which an upshift from a first transmission speed ratio to a second transmission speed ratio is carried out through concurrent disengagement of first and second off-going fluid pressure operated torque transmitting means associated with the first of such speed ratios and engagement of first and second on-coming fluid pressure operated torque transmitting means associated with the second of such speed ratios, wherein a third speed ratio lower than the second speed ratio is effected when the first on-coming torque transmitting means is engaged while the second off-going torque transmitting means is still engaged, and further having turbine and output speed sensing means, a method of controlling the torque transmitting means to effect an upshifting from the first speed ratio to the second speed ratio comprising the steps of:
   beginning a shift to the third speed ratio by releasing the first off-going torque transmitting means and gradually engaging the first on-coming torque transmitting means while the second off-going torque transmitting means is still engaged, so that the turbine speed gradually decreases relative to the output speed,
   determining from the turbine speed and the output speed when the relative speeds attain a predetermined relationship, and then
   effecting the second ratio by releasing the second off-going torque transmitting means, engaging the second on-coming torque transmitting means and completing the engagement of the first on-coming torque transmitting means.

2. The invention as defined in claim 1 wherein the step of beginning a shift to the third speed ratio comprises:
   gradually releasing the first off-going torque transmitting means and at the same time gradually engaging the first on-coming torque transmitting means, and
   when a given speed relationship is attained, fully releasing the first off-going torque transmitting means and applying a closed-loop control to the first on-coming torque transmitting means whereby a speed differential between input and output elements of the first on-coming torque transmitting means is controlled to a slip speed profile to attain synchronous speed for the second speed ratio.

3. The invention as defined in claim 2 wherein the step of effecting the second ratio includes:
   detecting when the turbine speed is near synchronous speed for the second speed ratio,
   when near synchronous speed is detected, gradually releasing the second off-going torque transmitting means, and
   when synchronous speed is attained, gradually engaging the second on-coming torque transmitting means.

4. In a vehicular automatic transmission having an input and an output, a turbine connected to the input to couple driving torque thereto, in which an upshift from a first transmission speed ratio to a second transmission speed ratio is carried out through concurrent disengagement of first and second off-going fluid pressure operated torque transmitting devices associated with the first speed ratio and engagement of first and second on-coming fluid pressure operated torque transmitting devices associated with the second speed ratio, wherein a third speed ratio lower than the second speed ratio is effected when the first on-coming torque transmitting device is engaged while the second off-going torque transmitting device is still engaged, and further having turbine and output speed sensing means, the method of controlling the torque transmitting devices to effect a shifting from the higher speed ratio to the lower speed ratio comprising the steps of:
   commanding a progressively decreasing hydraulic pressure on the first off-going torque transmitting device during a pressure relief period,
   during the said pressure relief period, commanding supplied pressure to the first on-coming torque transmitting device for a set time and then commanding the supplied pressure to an initial value and increasing the commanded pressure at a rate calibrated to achieve a timely decrease in turbine speed,
   when a turbine speed decrease is obtained, removing the pressure from the first off-going torque transmitting device and initiating a closed-loop control period of the first on-coming torque transmitting device,
   during the closed-loop control period, controlling the pressure command on the first on-coming torque transmitting device to control the sensed turbine speed according to a predetermined function of speeds,
   during the closed-loop period, initiating the removal of pressure from the second off-going torque transmitting device and preparing the second on-coming torque transmitting device to assume torque carrying capacity,
   detecting release of the second off-going torque transmitting device, when release of the second off-going torque transmitting device is detected, gradually increasing the commanded on-coming pressure on the first and second on-coming torque transmitting devices to a maximum value.

5. The invention as defined in claim 4 wherein the step of controlling the pressure command comprises establishing a slip speed profile, where slip speed is the difference between the turbine speed and the product of the second ratio and the output speed, calculating the slip speed, and progressively changing the commanded pressure on the first on-coming torque transmitting device pressure to control the slip speed in accord with the profile.

6. The invention as defined in claim 4 including the step of:
  detecting a near synchronization condition of the turbine speed which occurs during the closed-loop control period when the turbine speed becomes less than (No*SR1)+K1, where No is the sensed output speed, SR1 is the second speed ratio and K1 is a predefined constant, and
  initiating the removal of pressure from the second off-going torque transmitting device when said near synchronization condition is detected.

7. The invention as defined in claim 6 wherein the step of detecting release of the second off-going torque transmitting device, comprises detecting turbine speed pullup where turbine speed is greater by a set value than a minimum turbine speed recorded following the detection of said near synchronization condition.

8. The invention as defined in claim 4 wherein the step of commanding a progressively decreasing hydraulic pressure on the first off-going torque transmitting device comprises commanding an intermediate pressure thereafter commanding an initial ramp pressure, and then commanding a decreasing ramp pressure.

9. The invention as defined in claim 4 including the step of determining when turbine speed is less than a set value plus the product of output speed and the first speed ratio to detect turbine speed pulldown during the pressure relief period, wherein the steps of removing the pressure from the first off-going torque transmitting device and initiating a closed-loop control period of the first on-coming torque transmitting device occur when turbine speed pulldown is detected.

10. The invention as defined in claim 4 wherein synchronization is determined when the turbine speed is substantially equal to the product of the output speed and the second speed ratio, including the step of commanding maximum pressure on both on-coming torque transmitting devices when synchronization has been detected for a set number of times.

* * * * *